(12) United States Patent
Aoki

(10) Patent No.: US 10,755,073 B2
(45) Date of Patent: Aug. 25, 2020

(54) BIOLOGICAL-IMAGE PROCESSING UNIT AND METHOD AND PROGRAM FOR PROCESSING BIOLOGICAL IMAGE

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 117 days.

(21) Appl. No.: 16/113,045

(22) Filed: Aug. 27, 2018

(65) Prior Publication Data
US 2019/0065819 A1 Feb. 28, 2019

(30) Foreign Application Priority Data
Aug. 30, 2017 (JP) ................ 2017-165806

(51) Int. Cl.
*G06K 9/00* (2006.01)
*G06K 9/62* (2006.01)

(52) U.S. Cl.
CPC ..... *G06K 9/00067* (2013.01); *G06K 9/00087* (2013.01); *G06K 9/00885* (2013.01); *G06K 9/6232* (2013.01); *G06K 2009/00932* (2013.01)

(58) Field of Classification Search
CPC .......... G06K 9/00067; G06K 9/00087; G06K 9/00885; G06K 9/6232; G06K 2009/00932; G06K 9/0885; H01L 51/0047; H01L 51/4253; H01L 27/307; H01L 51/424; C07D 307/77; C07D 307/93; C09K 11/06;
(Continued)

(56) References Cited

U.S. PATENT DOCUMENTS

| 8,787,622 B2* | 7/2014 | Watanabe | G06K 9/00342 382/115 |
| 2002/0126882 A1* | 9/2002 | Funahashi | G06K 9/00087 382/124 |
| 2003/0229636 A1* | 12/2003 | Mattausch | G06K 9/00986 |

(Continued)

FOREIGN PATENT DOCUMENTS

| CN | 104081435 A * | 10/2014 | ......... G06K 9/6215 |
| JP | 2016-009379 | 1/2016 | |

(Continued)

OTHER PUBLICATIONS

Herve Jegou et al: "Hamming Embedding and Weak Geometric Consistency for Large Scale Image Search" In: "Serious Games", Jan. 1, 2008, XP055543328. Springer International Publishing, ISBN: 978-3-642-15171-2. vol. 5302, pp. 304-317.*

(Continued)

*Primary Examiner* — Mahendra R Patel
(74) *Attorney, Agent, or Firm* — Fujitsu Patent Center

(57) ABSTRACT

An apparatus includes a processor that extracts a plurality of feature points from a biological image, calculates a feature value of each of the plurality of extracted feature points, normalizes the calculated feature values to values of N levels (N is any natural number) based on a distribution of the feature values, and translates each normalized feature value to binary data by setting a number of bits corresponding to the normalized feature value to one of two digits in accordance with to a given order to make the normalized feature value and the number of bits with the one digit proportional to each other.

12 Claims, 12 Drawing Sheets

(58) Field of Classification Search
CPC .... C09K 2211/1011; C09K 2211/1096; C09K 2211/1014; H04L 9/3231; G06F 21/32
USPC .................................. 382/115, 116; 707/756
See application file for complete search history.

(56) References Cited

U.S. PATENT DOCUMENTS

| | | | | |
|---|---|---|---|---|
| 2004/0172535 | A1* | 9/2004 | Jakobsson | H04L 9/3226 713/168 |
| 2006/0056700 | A1* | 3/2006 | Abiko | G06K 9/0002 382/190 |
| 2008/0233576 | A1* | 9/2008 | Weston | G06K 9/6231 435/6.12 |
| 2009/0012766 | A1* | 1/2009 | Miyake | G16B 25/00 703/11 |
| 2010/0046810 | A1* | 2/2010 | Yamada | G06K 9/00026 382/124 |
| 2010/0115597 | A1* | 5/2010 | Murakawa | H04L 9/3231 726/7 |
| 2011/0037875 | A1* | 2/2011 | Yamakoshi | H04N 5/2351 348/229.1 |
| 2011/0185176 | A1* | 7/2011 | Takahashi | H04L 63/0861 713/168 |
| 2012/0250948 | A1* | 10/2012 | Rickman | G06K 9/00885 382/115 |
| 2013/0262489 | A1* | 10/2013 | Shirakawa | G06F 16/24558 707/756 |
| 2016/0259841 | A1* | 9/2016 | Andrew | G06Q 50/16 |
| 2016/0292396 | A1* | 10/2016 | Akerwall | G06F 21/10 |
| 2017/0178305 | A1* | 6/2017 | Silver | G06T 5/002 |
| 2018/0260950 | A1* | 9/2018 | Samset | G06T 11/008 |
| 2019/0287266 | A1* | 9/2019 | Takahashi | G06K 19/06037 |

FOREIGN PATENT DOCUMENTS

| | | | | |
|---|---|---|---|---|
| WO | WO-2010050104 | A1 * | 5/2010 | ............. G06F 21/32 |
| WO | WO-2015165037 | A1 * | 11/2015 | ......... G06F 15/5838 |

OTHER PUBLICATIONS

EESR—Extended European Search Report dated Jan. 28, 2019 for corresponding European Patent Application No. 18189701.8.

Herve Jegou et al., "Hamming Embedding and Weak Geometric Consistency for Large Scale Image Search", In: "Serious Games", Jan. 1, 2008 (Jan. 1, 2008), Springer International Publishing, Cham, XP055543328. Cited in EESR dated Jan. 28, 2019 for corresponding European Patent Application No. 18189701.8.

Kadir A. Peker, "Binary SIFT: Fast Image Retrieval Using Binary Quantized SIFT Features", Content-Based Multimedia Indexing (CBMI), 2011 9th International Workshop on, Jun. 1, 2011 (Jun. 1, 2011), pp. 217-222, XP055542631. Cited in EESR dated Jan. 28, 2019 for corresponding European Patent Application No. 18189701.8.

Xinyang Yi et al., "Binary Embedding: Fundamental Limits and Fast Algorithm", Feb. 19, 2015 (Feb. 19, 2015), XP055542907, Retrieved from the Internet: URL:http://users.ece.utexas.edu/-cmcaram/pubs/binary embedding.pdf Cited in EESR dated Jan. 28, 2019 for corresponding European Patent Application No. 18189701.8.

Felix X. Yu et al., "Fast Binary Embedding for High-Dimensional Data", In: "Multimedia Data Mining and Analytics", Jan. 1, 2015 (Jan. 1, 2015), Springer International Publishing, Cham, XP055542908 Cited in EESR dated Jan. 28, 2019 for corresponding European Patent Application No. 18189701.8.

* cited by examiner

FIG. 3
| NORMALIZED FEATURE VALUE | BINARIZED FEATURE VALUE |
|---|---|
| 0 | 000 |
| 1 | 001 |
| 2 | 011 |
| 3 | 111 |
FIG. 4A
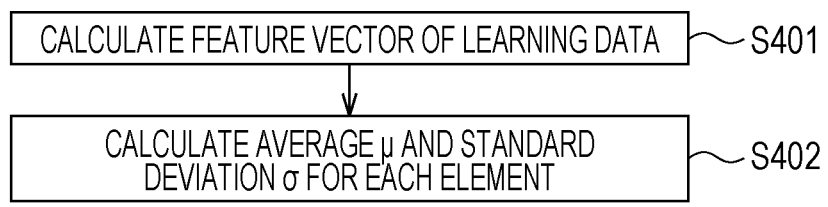
FIG. 4B
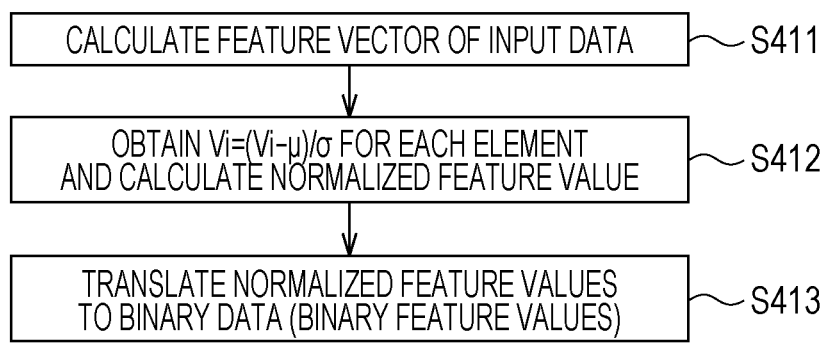

| REGISTRATION DATA | MATCHING DATA | | HAMMING DISTANCE |
|---|---|---|---|
| 000 | 000 | → | 0 |
| 000 | 001 | → | 1 |
| 000 | 011 | → | 2 |
| 000 | 111 | → | 3 |

|  | X-COORDINATE | Y-COORDINATE | FEATURE VALUE |
|---|---|---|---|
| FEATURE POINT 1 | 10 | 10 | F1 |
| FEATURE POINT 2 | 20 | 12 | F2 |
| FEATURE POINT 3 | 13 | 20 | F3 |

| RANKING | REGISTRATION DATA | FEATURE POINT OF MOST SIMILAR MATCHING DATA | FEATURE VALUE SCORE |
|---|---|---|---|
| 1 | FEATURE POINT 1 | FEATURE POINT 1 | 80 |
| 2 | FEATURE POINT 2 | FEATURE POINT 2 | 50 |
| 3 | FEATURE POINT 3 | FEATURE POINT 3 | 20 |
| 3 | FEATURE POINT 4 | FEATURE POINT 4 | 10 |

FIG. 17A

| REGISTRATION DATA | MATCHING DATA | | EUCLIDEAN DISTANCE |
|---|---|---|---|
| 0 | 0 | → | 0 |
| 0 | 1 | → | 1 |
| 0 | 2 | → | 2 |
| 0 | 3 | → | 3 |

FIG. 17B

| REGISTRATION DATA | MATCHING DATA | | HAMMING DISTANCE |
|---|---|---|---|
| 00 | 00 | → | 0 |
| 00 | 01 | → | 1 |
| 00 | 10 | → | 1 |
| 00 | 11 | → | 2 |

BIOLOGICAL-IMAGE PROCESSING UNIT AND METHOD AND PROGRAM FOR PROCESSING BIOLOGICAL IMAGE

CROSS-REFERENCE TO RELATED APPLICATION

This application is based upon and claims the benefit of priority of the prior Japanese Patent Application No. 2017-165806, filed on Aug. 30, 2017, the entire contents of which are incorporated herein by reference.

FIELD

The embodiments discussed herein are related to a biological-image processing unit, a method for processing a biological image, and a program for processing a biological image.

BACKGROUND

Biometrics authentication generally employs a matching method using feature points. The matching method using feature points performs matching based on feature values calculated from an image in the vicinity of characteristic points (feature points) extracted from the image. As illustrated in FIG. 15A, a branch point 1501, end points 1502 and 1503, and so on in a biological image 1500 of fingerprints, veins, or the like are extracted as feature points, and the feature values are calculated from an image around the feature points (see FIG. 15B).

In the matching process, for example, after both of registration data and matching data are approximately positioned and normalized, the feature values contained in the registration data and the feature values contained in the matching data are compared to search for the feature points of a paired matching image with respect to the feature points of the registered image. For example, for each of the feature points of the matching image whose spatial distances from the feature points of the registered image are equal to or less than a threshold, a feature value score indicating the degree of similarity of the feature value of each feature point between the registered image and the matching image is calculated, and a feature point of the matching image having the most similar feature value is selected and paired based on the calculated feature value score. The obtained feature value pairs are sorted based on the search results of all obtained feature points using the feature value scores, as illustrated in FIG. 16. The average of the higher-order feature value scores is obtained, and the score is used as the final score in the authentication in the matching process.

An object detecting apparatus has been proposed which binarizes an identifier corresponding to the detected object and a feature value generated from observation data based on predetermined threshold information (the number of thresholds and the values of the thresholds) to thereby speed up a process for calculating the inner product of the identifier and the feature value for use in an identifying process.

Examples of the related art include Japanese Laid-open Patent Publication No. 2016-9379.

SUMMARY

In one aspect of the embodiments, an apparatus includes a processor that extracts a plurality of feature points from a biological image, calculates a feature value of each of the plurality of extracted feature points, normalizes the calculated feature values to values of N levels (N is any natural number) based on a distribution of the feature values, and translates each normalized feature value to binary data by setting a number of bits corresponding to the normalized feature value to one of two digits in accordance with to a given order to make the normalized feature value and the number of bits with the one digit proportional to each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a binarization translation table in an embodiment;

FIGS. 4A and 4B are flowcharts illustrating a feature-value normalizing and binarizing process in an embodiment;

FIGS. 17A and 17B illustrate an example of the results of calculating the distance between feature values.

DESCRIPTION OF EMBODIMENTS

Figure 1:
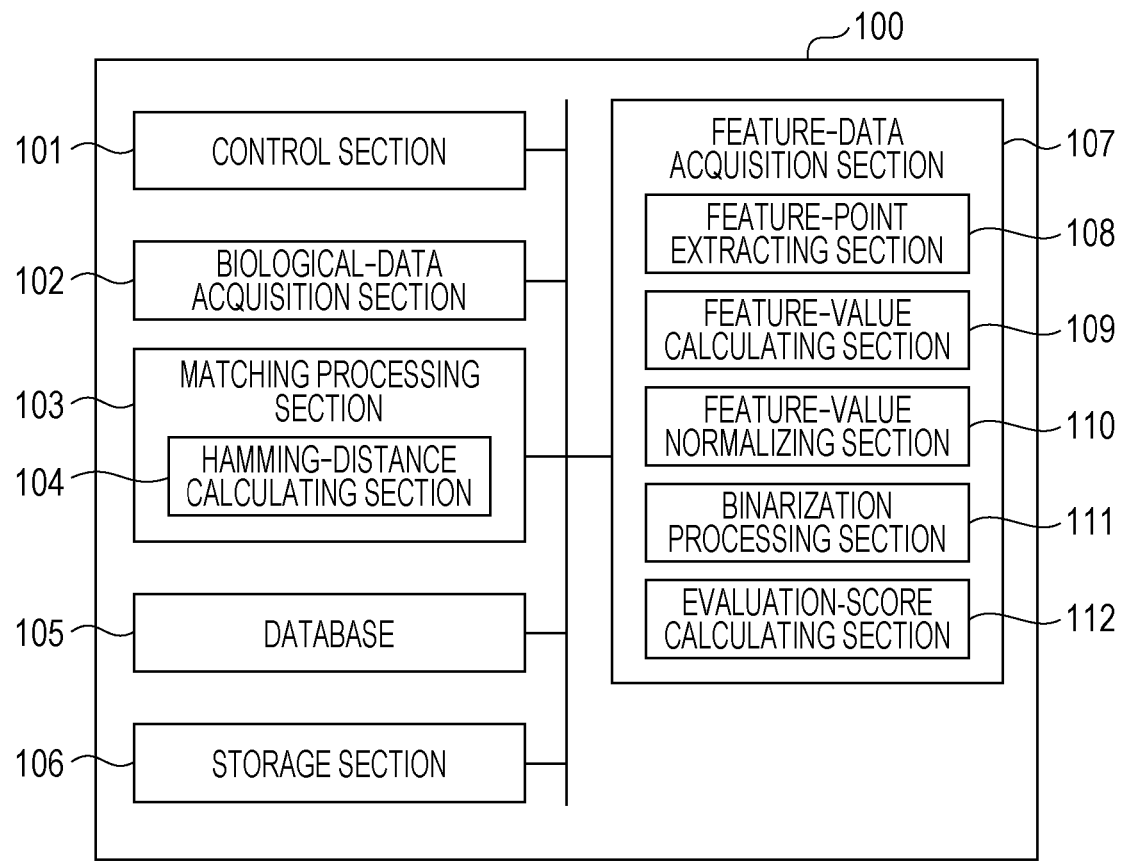
FIG. 1 is a diagram illustrating a configuration example of a biological-image processing unit according to a first embodiment of the present disclosure.

The feature values of the feature points of a registered image and a matching image are generally represented by floating point values. The difference between the feature values or the like is used as a feature value score indicating the degree of similarity between the feature values of the feature points of the registered image and the matching image. The feature value scores are generally calculated using a floating point operation, which takes much processing time.

An example of a method for speeding up the calculation of feature value scores is using the Hamming distance. To obtain the Hamming distance between feature values, the feature values obtained from the registered image and the matching image are each binarized, and the values of the same digit bits (the values of corresponding bits) in the obtained bit string are compared. As a result of comparison, the number of bits having different values among all the digits of the bit string is the Hamming distance between the feature values. Since the Hamming distance can be calculated by bit operation, high-speed calculation is possible.

FIGS. 17A and 17B are diagrams illustrating the result of calculation of the distance between feature values obtained by normalizing the feature values of the registered image and the matching image, in which the normalized values take values of four levels, 0, 1, 2, and 3. FIGS. 17A and 17B illustrate distance calculation results in the case where the normalized feature values of the registration data are 0, and the normalized feature values of the matching data are 0, 1, 2, and 3. FIG. 17A illustrates an example of the results of calculating the Euclidean distance as the distance between the feature values using the normalized feature values. FIG. 17B illustrates an example of the results of calculating the Hamming distance as the distance between the feature values using the binarized feature values (binarized feature values) obtained by simply binarizing the normalized feature values, which take values of four levels, 0, 1, 2, and 3, to two-bit binary data according to binary notation. In other words, FIG. 17B illustrates a case in which the normalized feature value "0" is translated to a binarized feature value "00", the normalized feature value "1" is translated to a binarized feature value "01", the normalized feature value "2" is translated to a binarized feature value "10", and the normalized feature value "3" is translated to a binarized feature value "11".

As illustrated in FIG. 17A, the Euclidean distance obtained using the normalized feature values is a distance corresponding to the difference in feature value between the registration data and the matching data. In contrast, as illustrated in FIG. 17B, the Hamming distance calculated using a binarized feature value obtained by simply binarizing the feature value is 1 in the case where the binarized feature value of the matching data is "01" (corresponding to the normalized feature value "1" and "10" (corresponding to the normalized feature value "2"), which does not indicate the distance corresponding to the difference in feature value between the registration data and the matching data.

Thus, simply binarizing the feature values causes the Hamming distance calculated using the binarized feature value to differ from the distance corresponding to the difference in feature value between the registration data and the matching data, not reflecting the relationship between the magnitudes of the feature values. In other words, the feature value score calculated using the Hamming distance does not reflect the degree of similarity between the feature values, so that authentication accuracy is not ensured.

Embodiments of the present disclosure will be described hereinbelow with reference to the drawings.

The binary translation of feature values in a biological-image processing unit according to an embodiment of the present disclosure will be described. First, the biological-image processing unit normalizes the feature values of feature points obtained from a biological image based on the distribution of the feature values to values of N levels (N is a natural number) of 0, 1, ..., (N−1) of each element. For example, the biological-image processing unit obtains the feature values of the feature points from a plurality of biological images in advance, obtains an average value $\mu$ and a standard deviation $\sigma$ for each element using the feature values as learning data, and normalizes the feature values based on the obtained average value $\mu$ and the standard deviation $\sigma$ to equalize the probability of appearance of the feature values.

The biological-image processing unit translates the normalized feature values (normalized feature values) that takes N-step values to (N−1)-bit binary data (binarized feature values). The least significant bit (LSB) of the (N−1)-bit binary data is set to the 0th bit, and the most significant bit (MSB) is set to the (N−2)th bit. For example, the normalized feature value is i (i=0, 1, ..., N−1), the low-order i bits of the (N−1) bits are set to value "1", and the remaining bits are set to value "0".

Figure 2:
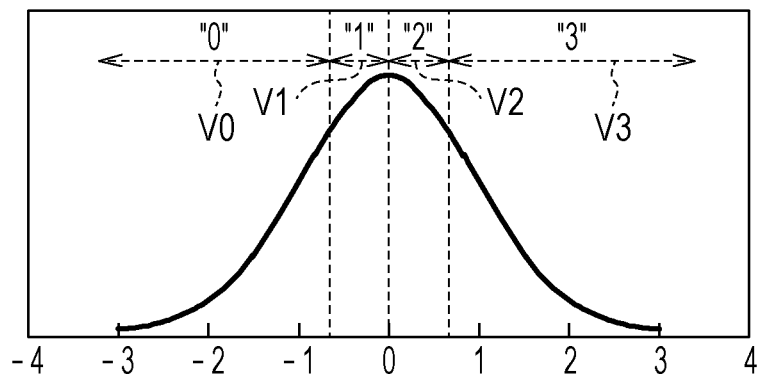
FIG. 2 is a diagram illustrating normalization of feature values in an embodiment.

For example, it is assumed that the feature values of the feature points have the distribution illustrated in FIG. 2. In FIG. 2, the horizontal axis represents feature values expressed with the average value $\mu$ as 0 in units of standard deviation $\sigma$, and the vertical axis represents the probability density. Normalized feature values "0", "1", "2", and "3" are respectively assigned to regions V0, V1, V2, and V3 that are obtained by dividing the range of the feature values in order from the smaller value expressed in units of the standard deviation $\sigma$ so as to have equal probability of appearance. The normalized feature value "0" is translated to a binarized feature value "000", and the normalized feature value "1" is translated to a binarized feature value "001" according to a binarization translation table 301 illustrated in FIG. 3. The normalized feature value "2" is translated to a binarized feature value "011", and the normalized feature value "3" is translated to a binarized feature value "111".

Thus, the biological-image processing unit translates the feature values in the region V0 to the binarized feature value "000" and the feature values in the region V1 to the binarized feature value "001" so that the magnitude of the feature value is proportional to the ratio between the values "1" and "0". The biological-image processing unit translates the feature values in the region V2 to the binarized feature value "011", and the feature values in the region V3 to the binarized feature value "111".

The binary translation of feature values in the present embodiment is implemented by the biological-image processing unit executing the processes illustrated in FIGS. 4A and 4B, for example. FIGS. 4A and 4B are flowcharts illustrating an example of a normalizing and binarizing process in the present embodiment. In the learning phase illustrated in FIG. 4A, in step S401, the biological-image processing unit calculates the feature values of the feature points (feature vectors) from a plurality of biological images for use as learning data. Next, in step S402, the biological-image processing unit calculates the average value $\mu$ and the standard deviation $\sigma$ of each element from the feature values (feature vectors) of the learning data calculated in step S401. The biological-image processing unit normalizes the feature values of the feature points (feature vectors) for each element based on the calculated average value $\mu$ and standard deviation $\sigma$ in the feature extraction phase illustrated in FIG. 4B.

In the feature extraction phase illustrated in FIG. 4B, in step S411, the biological-image processing unit calculates the feature values of the feature points (feature vectors) from a biological image input as input data. Next, in step S412, the biological-image processing unit obtains a value Vi in units of standard deviation σ by calculating Vi=(vi−μ)/σ using a feature value vi, the average value μ, and the standard deviation σ calculated in the learning phase for each of the feature values (feature vectors) of the input data calculated in step S411 and calculates the normalized feature value from the value Vi. Next in step S413, the biological-image processing unit translates the normalized feature values calculated in step S412 to binary data (binarized feature values) according to the binarization translation table.

Figures 5, 6:
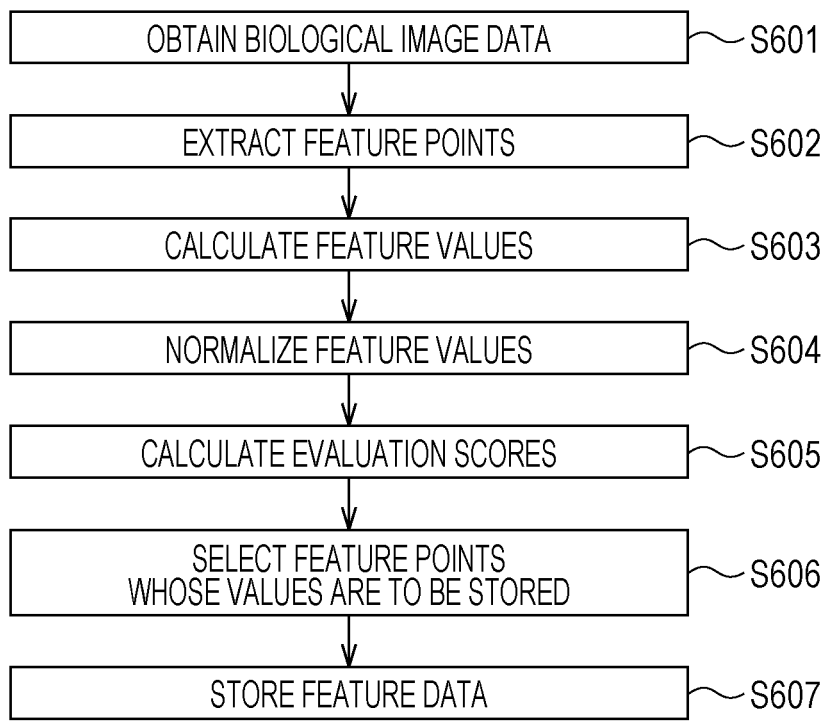
FIG. 5 is a diagram illustrating an example of a matching process in an embodiment.
FIG. 6 is a flowchart illustrating an example of an operation for registering feature data in the first embodiment.

FIG. 5 illustrates an example of the result of calculation of the Hamming distance as the distance between feature values using the binarized feature values translated by binary translation of feature values in the present embodiment. FIG. 5 illustrates distance calculation results in the case where the normalized feature values of the registration data are 0 and the normalized feature values of the matching data are 0, 1, 2, and 3, as in the example illustrated in FIG. 17A.

As illustrated in the example in FIG. 5, the Hamming distances calculated using the binarized feature values obtained become the same as the Euclidean distances calculated using the normalized feature values by applying binary translation of feature values in the present embodiment so that the magnitude of each feature value is proportional to the ratio of values "1" and "0". Therefore, the Hamming distances calculated using the binarized feature values in the present embodiment are distances according to the difference in feature value between the registration data and the matching data, reflecting the magnitude relationship between the feature values. Thus, the feature value score calculated using the Hamming distance reflects the degree of similarity between the feature values, increasing the accuracy of biometrics authentication. Furthermore, the use of the Hamming distance in calculating the feature value score allows the matching process in biometrics authentication to be increased in speed.

In the above description, in the case where the normalized feature value is i (i=0, 1, . . . , N−1) in translation from normalized feature values to binary data (binarized feature values), the low-order i bits of the (N−1) bits are set to value "1", and the remaining bits are set to value "0". This is given for mere illustrative purposes. For example, the high-order i bits of the (N−1) bits may be set to value "1", and the remaining bits may be set to value "0", or i bits of the (N−1) bits may be set to value "1", and the remaining bits may be set to value "0" according to specified order.

In the case where the value to be set to each bit is inverted, and the normalized feature value is i, i bits of the (N−1) bits may be set to value "0", and the remaining bits may be set to value "1". In the above description, the normalized feature values take values of four levels, 0, 1, 2, and 3. This is given for mere illustrative purposes. The normalized feature values may be any values.

In the case where the normalized feature value is i, a number of bits proportional to the value i of the normalized feature value may be set to value "1" or "0", and the size (the number of bits) of the binary data (binarized feature value) may be changed correspondingly. In the case where the normalized feature value is i, more than i bits may be set to value "1" or "0"; the feature value and the ratio between the value "1" and the value "0" may be proportional to each other.

First Embodiment

A first embodiment of the present disclosure will be described. Hereinafter, an example in which a biological-image processing unit incorporating binary translation of feature values in the present embodiment is used for a biometrics authentication apparatus, such as a palm vein authentication apparatus or a fingerprint authentication apparatus, that performs biometrics authentication using a biological image will be described.

FIG. 1 is a diagram illustrating a configuration example of the biological-image processing unit of the first embodiment. The biological-image processing unit 100 includes a control section 101, a biological-data acquisition section 102, a matching processing section 103, a database 105, a storage section 106, and a feature-data acquisition section 107.

The control section 101 controls the entire biological-image processing unit 100 and controls over the functional sections of the biological-image processing unit 100. The biological-data acquisition section 102 executes a process for obtaining a biological image of an object to obtain biological image data. Examples of the biological-data acquisition section 102 include a fingerprint sensor and a vein sensor. A biological-image capturing section of a fingerprint sensor or a vein sensor may be provided outside the biological-image processing unit 100, and the image capturing section and the biological-data acquisition section 102 may be connected via an interface, such as the Internet or a universal serial bus (USB), to obtain a biological image acquired by the image capturing section.

The matching processing section 103 performs a process for matching registration data (template) and matching data (input data) with each other using feature data obtained by the feature-data acquisition section 107. The matching processing section 103 includes a Hamming-distance calculating section 104. The Hamming-distance calculating section 104 calculates the Hamming distance between the feature values of the registration data and the matching data by performing bit operation using binary data (binarized feature values) obtained by binary translation of the feature values in the present embodiment. The Hamming-distance calculating section 104 performs an exclusive-OR operation (EX-OR operation) between corresponding bits in the binary data (binarized feature values) of the feature values of the registration data and matching data and sets the number of bits for which the operation result is "1" as the Hamming distance. The matching processing section 103 calculates the degree of similarity (feature value score) indicating how similar the feature values of the feature points are between the registration data and the matching data based on the Hamming distances calculated by the Hamming-distance calculating section 104 and outputs the degree of similarity.

The database 105 stores data, such as registration data and identification data (ID), for use in biometrics authentication. In the present embodiment, the feature values of the feature points contained in the registration data to be stored in the database 105 are normalized feature values. The feature values are translated from the normalized feature values to binary data (binarized feature values) at matching of feature data (at loading to the storage section 106 or immediately before the matching process is executed). The storage section 106 is used as an image buffer that stores the biological image. An example of the database 105 is a non-volatile storage section, such as a hard disk drive (HDD). An example of the storage section 106 is a semiconductor memory for use as a so-called work memory.

The feature-data acquisition section 107 obtains feature data (the coordinates, the feature values, and so on of the feature points) for use in authentication from the biological image. The feature-data acquisition section 107 includes a feature-point extracting section 108, a feature-value calculating section 109, a feature-value normalizing section 110, a binarization processing section 111, and an evaluation-score calculating section 112.

The feature-point extracting section 108 extracts information on the feature points from the biological image data. The feature-point extracting section 108 is an example of an extraction section. The feature-point extracting section 108 extracts a plurality of branch points and end points of, for example, fingerprints or veins, from a biological image of fingerprints or veins as characteristic points (feature points). The feature-value calculating section 109 calculates the feature values of the feature points from an image around the feature points based on the extracted feature points using, for example, a principal component analysis (PCA).

The feature-value normalizing section 110 normalizes the feature values calculated by the feature-value calculating section 109. The feature-value normalizing section 110 is an example of a normalizing section. The feature-value normalizing section 110 normalizes the feature values to values of N levels (N is a natural number) of 0, 1, . . . , (N−1) using statistical information (the average value $\mu$ and the standard deviation $\sigma$ of each element) based on the distribution of the feature values obtained in advance from the learned data.

The binarization processing section 111 executes a process of binary translation of feature values in the present embodiment described above to translate the normalized feature values to binary data (binarized feature values). In the translation from the normalized feature values to binary data (binarized feature values), the binarization processing section 111 sets a number of bits proportional to the normalized feature value to value "1", and sets the remaining bits to value "0". The binarization processing section 111 includes a binarization translation table, which is an example of a translation table, and translates the normalized feature values to binarized feature values using the binarization translation table. The binarization processing section 111 may not include the binarization translation table and may translate the normalized feature values to binarized feature values by computational processing or the like.

The evaluation-score calculating section 112 calculates an evaluation score, which is a value (quality index) indicating how effective the feature point is for each feature point. For example, the upper limit size of the registration data (template) is set according to the storage capacity of the database 105 or the communication band. For that reason, the evaluation-score calculating section 112 calculates an evaluation score for each feature point and uses the calculated evaluation score to select a feature point with the feature-data acquisition section 107. In other words, the feature-data acquisition section 107 chooses feature points based on the evaluation scores calculated by the evaluation-score calculating section 112 to generate registration data and stores the registration data in the database 105.

In the present embodiment, the evaluation-score calculating section 112 obtains the evaluation score by calculating the sum of the absolute values of values indicating the elements of the feature value (feature value vector) in units of standard deviation $\sigma$ using a feature value before being normalized. For example, in the case where the feature value vector f1 of a feature point A is (0.2$\sigma$, 0.0$\sigma$, 0.7$\sigma$, 1.2$\sigma$), the evaluation score of the feature point A is expressed as 0.2+0.0+0.7+1.2=2.1. In the case where the feature value vector f2 of a feature point B is (1.5$\sigma$, 2.0$\sigma$, 1.7$\sigma$, −1.5$\sigma$), the evaluation score of the feature point B is expressed as 1.5+2.0+1.7+1.5=6.7.

Since the feature value of a feature point with a large difference from the average value, that is, whose sum of the absolute values of values expressed in unit of standard deviation $\sigma$ is large, has low probability of appearance, the feature value seems to be of great value. In contrast, the feature value of a feature point with a small difference from the average value has high probability of appearance. This tends to cause an error at the time of normalization. In other words, feature values with low probability of appearance seems to have larger information amount than feature values with high probability of appearance.

In this example, since the feature point B has a higher evaluation score, which is the sum of the absolute values of values expressed in units of standard deviation $\sigma$, the feature point B seems to appear with low frequency and is effective as a feature value. Therefore, when selecting one of the feature point A and the feature point B to generate registration data, the feature-data acquisition section 107 selects the feature point B having a higher evaluation score to generate registration data. Thus, selecting a feature value with a higher evaluation score based on the calculated evaluation scores and excluding average feature points having a relatively small amount of information in the matching process allows high-accuracy biometrics authentication.

Referring next to FIG. 6, the operation of the biological-image processing unit 100 at the time of registration of feature data in the first embodiment will be described. In registering the feature data, first in step S601, the biological-data acquisition section 102 obtains biological image data to be registered. Next in step S602, the feature-point extracting section 108 of the feature-data acquisition section 107 extracts branch points and end points as feature points from the biological image data obtained by the biological-data acquisition section 102 in step S601. Next in step S603, the feature-value calculating section 109 of the feature-data acquisition section 107 calculates the feature values of the feature points extracted by the feature-point extracting section 108 in step S602 from an image around the feature points.

In step S604, the feature-value normalizing section 110 of the feature-data acquisition section 107 normalizes the feature values calculated by the feature-value calculating section 109 in step S603. In step S605, the evaluation-score calculating section 112 of the feature-data acquisition section 107 calculates the evaluation scores of the feature points based on the feature values calculated by the feature-value calculating section 109 in step S603. In step S606, when the total size of the feature data exceeds a predetermined threshold, the feature-data acquisition section 107 selects feature points whose normalized feature values are to be stored based on the evaluation scores calculated by the evaluation-score calculating section 112 in step S605. In step S606, the feature-data acquisition section 107 selects feature points whose normalized feature values are to be stored such that feature points are deleted in ascending order of the calculated evaluation scores.

Next in step S607, the feature-data acquisition section 107 stores feature data (normalized feature values) on feature points that finally remain as the result of selection in step S606 in the database 105 as registration data (template). In the example illustrated in FIG. 6, the processes in step S605 and S606 are executed after the process in step S604 is executed. The present disclosure is not limited to the above. The order of the process in step S604 and the processes in step S605 and S606 are optional; the processes may be executed in reverse order or in parallel.

Figure 7:
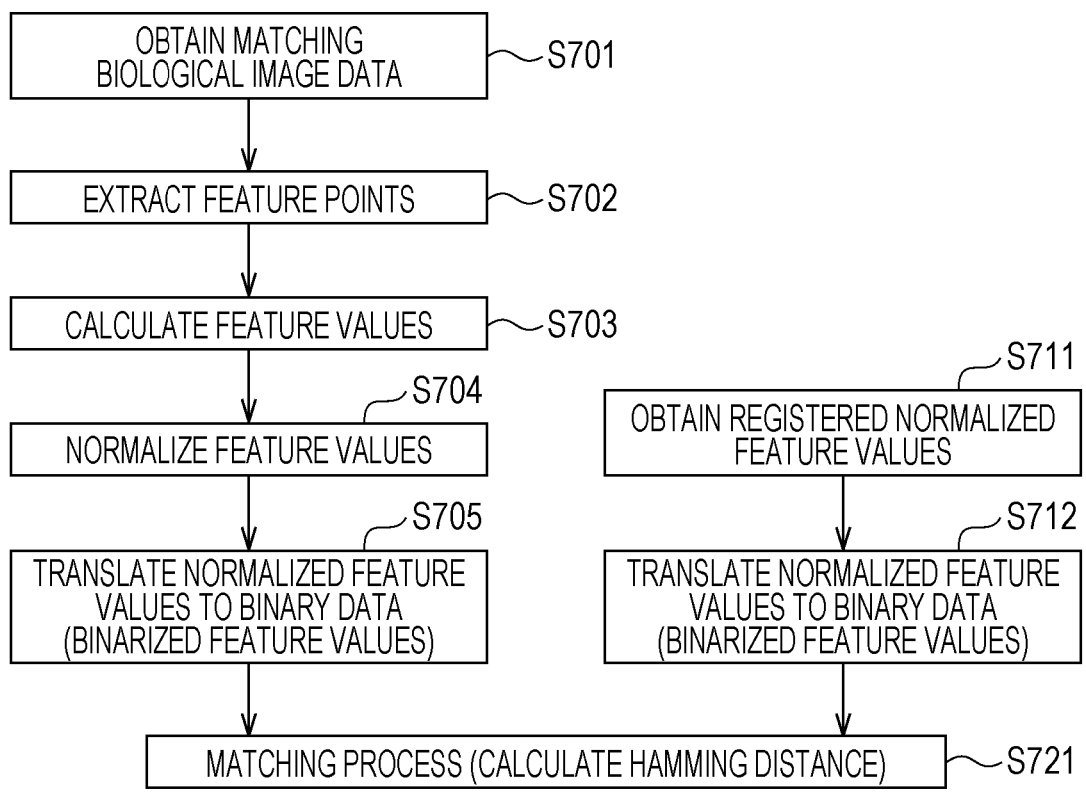
FIG. 7 is a flowchart illustrating an example of an operation for matching feature data in the first embodiment.

Referring next to FIG. 7, the operation of the biological-image processing unit 100 at feature data matching in the first embodiment will be described. In feature data matching, for the matching data, first in step S701, the biological-data acquisition section 102 obtains biological image data for matching. Next in step S702, the feature-point extracting section 108 of the feature-data acquisition section 107 extracts branch points and end points as feature points from the biological image data obtained by the biological-data acquisition section 102 in step S701. Next in step S703, the feature-value calculating section 109 of the feature-data acquisition section 107 calculates the feature values of the feature points extracted by the feature-point extracting section 108 in step S702 from an image around the feature points.

Next in step S704, the feature-value normalizing section 110 of the feature-data acquisition section 107 normalizes the feature values calculated by the feature-value calculating section 109 in step S703. Next in step S705, the binarization processing section 111 of the feature-data acquisition section 107 translates the feature values (normalized feature values) normalized by the feature-value normalizing section 110 in step S704 to binary data (binarized feature values).

For the registration data, in step S711, the feature-data acquisition section 107 loads the registration data from the database 105 to the storage section 106 to obtain the registered normalized feature values. Next, in step S712, the binarization processing section 111 of the feature-data acquisition section 107 translates the normalized feature values obtained in step S711 to binary data (binarized feature values).

After translation to binary data (binarized feature values) is executed in step S705 and step S712, in step S721, the matching processing section 103 performs a process for matching the registration data (template) and the matching data (input data). In step S721, the Hamming-distance calculating section 104 of the matching processing section 103 calculates the bits of the binary data (binarized feature values) of the feature values of the registration data and the matching data to calculate the Hamming distance between the feature values. The matching processing section 103 calculates the degree of similarity (feature value score) indicating how similar the feature values of the feature points are between the registration data and the matching data based on the Hamming distances calculated by the Hamming-distance calculating section 104 and determines whether the object is the identical person or another person based on the calculated degree of similarity (feature value score).

In the first embodiment, each normalized feature value is translated to binary data (binarized feature value) such that a number of bits proportional to the normalized feature value is set to one of value "1" and value "0", and the remaining bits are set to the other of value "1" and value "0". In other words, the feature value is translated to a binary value so that the feature value and the ratio between the value "1" and the value "0" are proportional to each other. This allows the feature value to be translated to binary data reflecting the magnitude of the feature value, allowing expressing the distance (difference) between the feature values using Hamming distance calculated using the binary data, thereby increasing the accuracy of biometrics authentication.

When the normalized feature values are stored in the database 105 as registration data (template) and the registration data is loaded to the storage section 106 for the matching process and so on, the data size of the registration data to be stored in the database 105 can be reduced by translating the normalized feature values to binary data (binarized feature values). For example, in the case where the normalized feature values take values of eight levels, the binary data (binarized feature values) is represented by at least seven bits although the normalized feature values can be represented by three bits. Therefore, storing the normalized feature values as registration data decreases the data size to 3/7 of the data size in the case where binary data (binarized feature values) is stored as registration data. For example, decreasing the data size of the registration data allows skipping data compression processing or reduces the time for transferring the data, thereby reducing the processing time.

Second Embodiment

Figure 8:
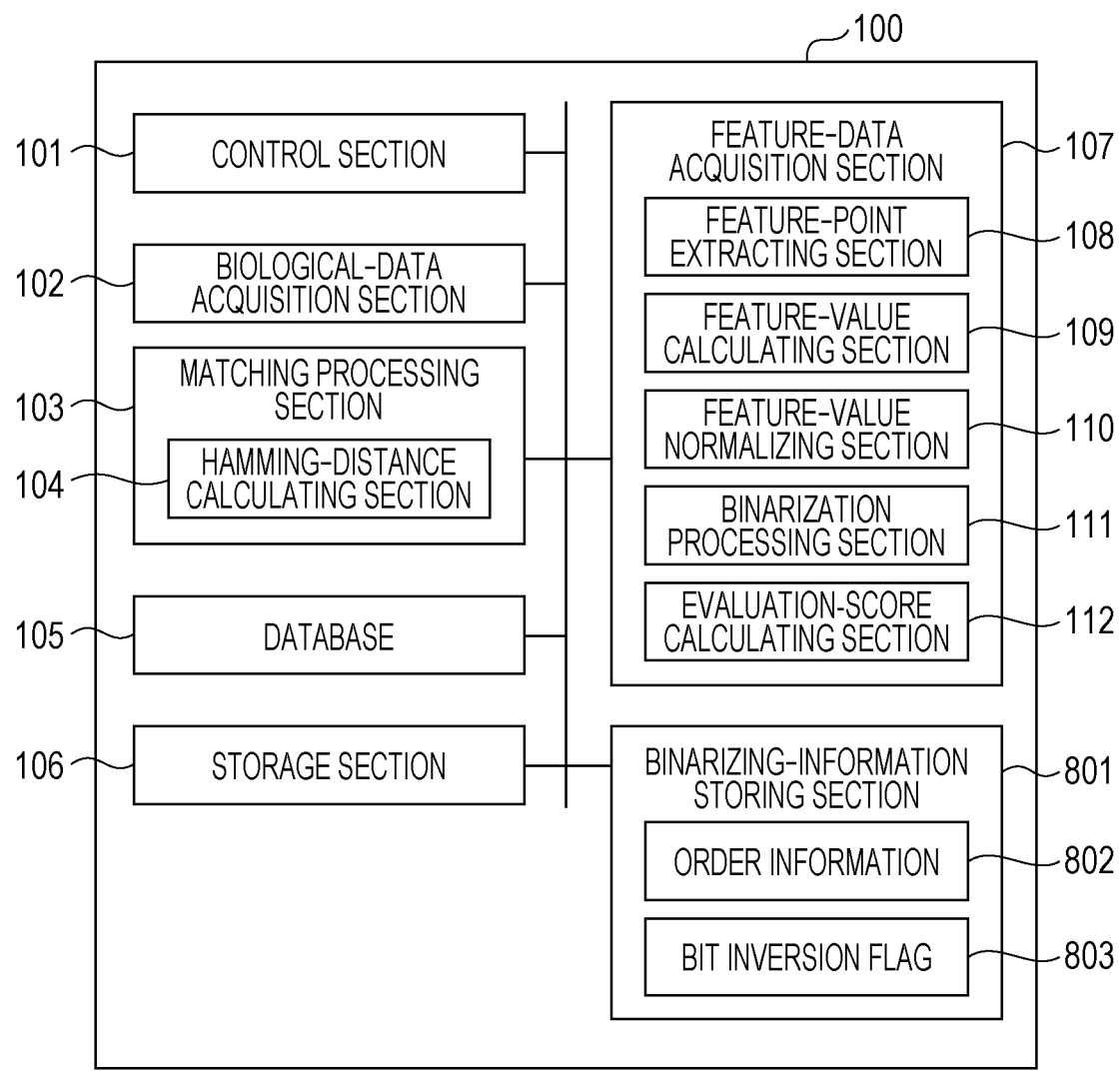
FIG. 8 is a diagram illustrating a configuration example of a biological-image processing unit according to a second embodiment of the present disclosure.

Next, a second embodiment of the present disclosure will be described. Hereinafter, an example in which a biological-image processing unit incorporating binary translation of feature values in the present embodiment is used for a biometrics authentication apparatus, such as a palm vein authentication apparatus or a fingerprint authentication apparatus, that performs biometrics authentication using a biological image will be described. FIG. 8 is a diagram illustrating a configuration example of the biological-image processing unit of the second embodiment. In FIG. 8, the blocks having the same functions as the blocks illustrated in FIG. 1 are given the same reference signs, and duplicate descriptions will be omitted.

A biological-image processing unit 100 of the second embodiment includes a control section 101, a biological-data acquisition section 102, a matching processing section 103, a database 105, a storage section 106, a feature-data acquisition section 107, and a binarizing-information storing section 801. The binarizing-information storing section 801 stores binarizing information related to translation from normalized feature values to binary data (binarized feature values).

In the present embodiment, the binarization processing section 111 of the feature-data acquisition section 107 executes binary translation of feature values based on the binarizing information stored in the binarizing-information storing section 801 to translate the normalized feature values to binary data (binarized feature values). For example, the binarization processing section 111 includes a plurality of binarization translation tables and executes binary translation of feature values while switching among the reference binarization translation tables based on the binarizing information stored in the binarizing-information storing section 801.

The binarizing information stored in the binarizing-information storing section 801 includes order information 802 and a bit inversion flag 803. The order information 802 is information indicating the order of bits to which value "1" is set according to the normalized feature values in translation from the normalized feature values to binary data (binarized feature values). The bit inversion flag 803 is information that inverts the values of all the bits of the binary data (binarized feature values) when the bit inversion flag 803 is set (value "1"). In other words, in the case where the bit inversion flag 803 is set (value "1"), a number of bits proportional to the normalized feature value are set to value "0", and the remaining bits are set to value "1". In the case where the bit inversion flag 803 at the binarization is set at the same value, the same Hamming distance is obtained even if the bit values of the binary data (binarized feature values) are inverted.

Figure 9A:
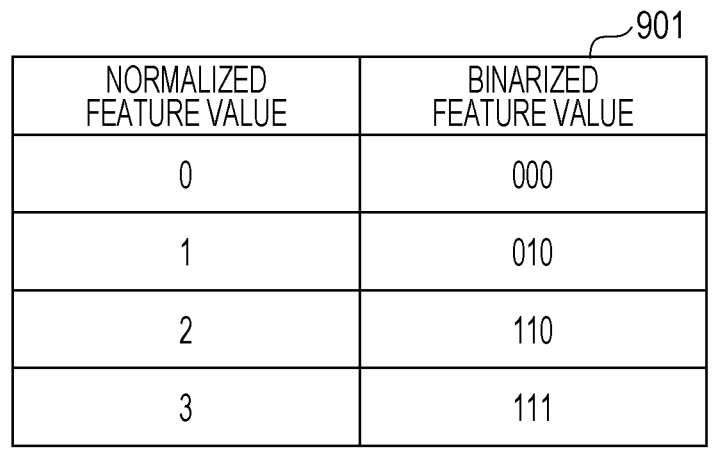
FIGS. 9A and 9B are diagrams illustrating an example of a binarization translation table in the second embodiment.
Figure 9B:
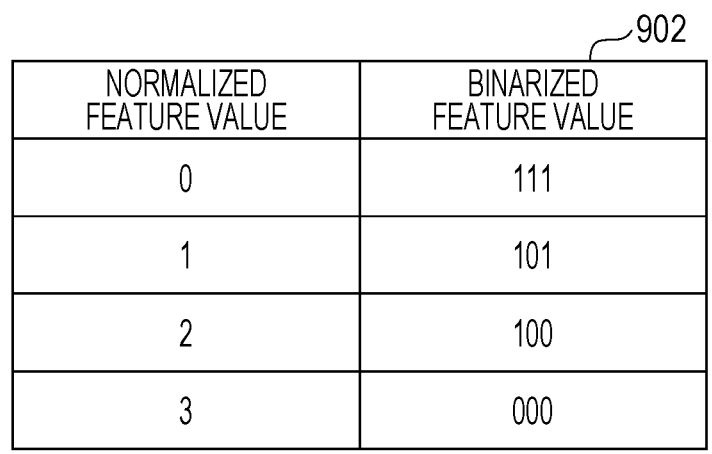

For example, in the case where the normalized feature values takes values of four levels, 0, 1, 2, and 3, if the order information 802 is, for example, {1,2,0}, and the bit inversion flag 803 is not set (has been reset), the binary data is set to value "1" in order of the first bit, the second bit, and the zeroth bit according to the normalized feature value. FIG. 9A illustrates a binarization translation table 901 in that case. For example, when the order information 802 is {1,0,2}, and the bit inversion flag 803 has been set, the binary data is set to value "0" in order of the first bit, the zeroth bit, and the second bit according to the normalized feature value. FIG. 9B illustrates a binarization translation table 902 in that case.

The following is an example in which the feature values of the feature points contained in the registration data to be stored in the database 105 are binary data (binarized feature values), and the normalized feature values are translated to binary data (binarized feature values) at the registration of the feature data. However, this is given for mere illustrative purposes. The normalized feature values may be stored in the database 105 as registration data, and the normalized feature values may be translated to binary data (binarized feature values) at the loading to the storage section 106 or immediately before a matching process is performed.

In the present embodiment, since binary data (binarized feature values) is obtained at the generation of the registration data, the evaluation-score calculating section 112 of the feature-data acquisition section 107 may calculate the evaluation scores of the feature points from the binary data (binarized feature values). Thus, the evaluation scores are not stored at the generation of the registration data, and the amount of data processed after the binary translation of the feature values can be reduced. A feature value having a large difference from the average value seems to have low probability of appearance and to have more information amount than a feature value having a smaller difference from the average value. A normalized feature value 0 or (N−1) indicates that the feature value is significantly separated from the average value.

For that reason, the present embodiment obtains the number of bits with value "1" and the number of bits with value "0" in each element of the binary data (binarized feature values), and uses the maximum value (greater value) as an element evaluation score and the sum of the element evaluation scores as the evaluation score of the feature point. In other words, for example, in the case where the binarized feature values are 000 and 111, the element evaluation score is 3, and in the case where the binarized feature values are 001 and 011, the element evaluation score is 2. For example, in the case where the binary data (binarized feature value) of the feature point A is (001, 001, 011, 001), the evaluation score of the feature point A is 2+2+2+2=8. In the case where the binary data (binarized feature value) of the feature point B is (000, 000, 111, 001), the evaluation score of the feature point B is 3+3+3+2=11.

Figure 10:
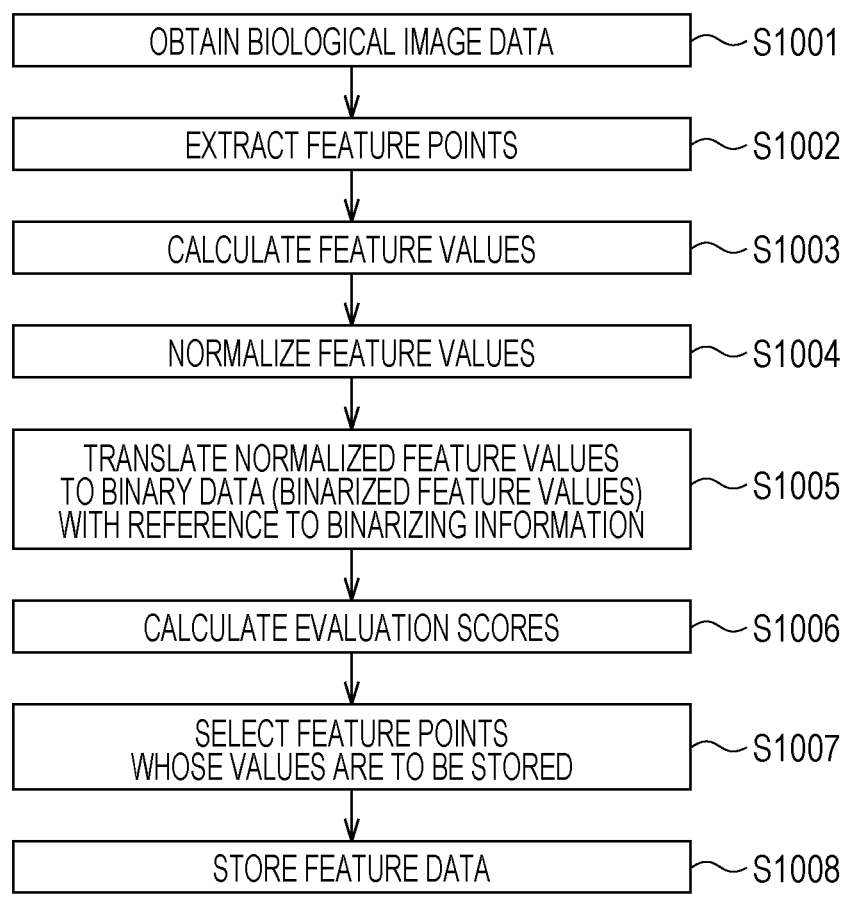
FIG. 10 is a flowchart illustrating an example of an operation for registering feature data in the second embodiment.

Referring next to FIG. 10, the operation of the biological-image processing unit 100 at the registration of feature data in the second embodiment will be described. In the operation at the registration of feature data illustrated in FIG. 10, the processes from step S1001 to S1004 are the same as the processes from step S601 to S604 at the registration of feature data in the first embodiment illustrated in FIG. 6. In step S1005, the binarization processing section 111 of the feature-data acquisition section 107 translates the feature values (normalized feature values) normalized by the feature-value normalizing section 110 in step S1004 to binary data (binarized feature values) with reference to the binarizing information stored in the binarizing-information storing section 801.

Next in step S1006, the evaluation calculating section 112 of the feature-data acquisition section 107 calculates the evaluation scores of the feature points based on the binary data (binarized feature values) translated by the binarization processing section 111 in step S1005. In step S1007, when the total size of the feature data exceeds a predetermined threshold, the feature-data acquisition section 107 selects feature points whose binary data (binarized feature values) is to be stored based on the evaluation scores calculated by the evaluation-score calculating section 112 in step S1006. Next in step S1008, the feature-data acquisition section 107 stores the binary data (binarized feature values) on the feature points selected in step S1007 in the database 105 as registration data (template).

Figure 11:
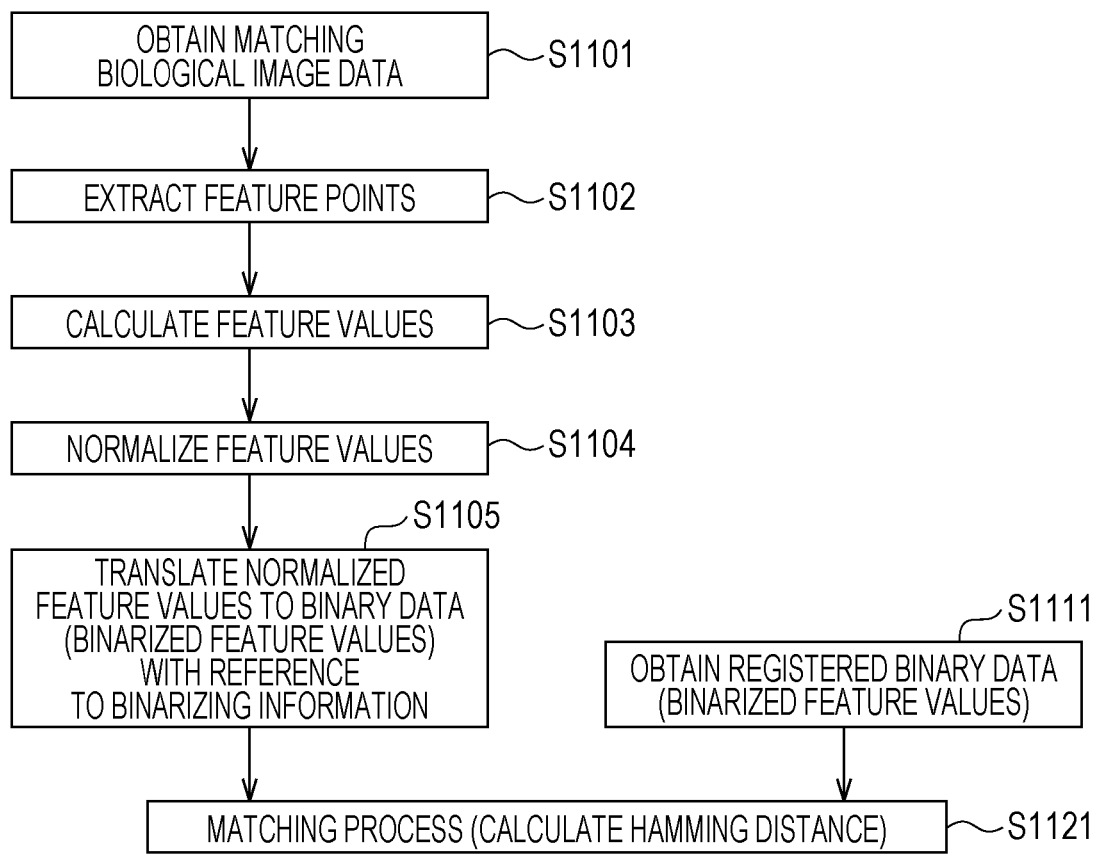
FIG. 11 is a flowchart illustrating an example of an operation for matching feature data in the second embodiment.

Referring next to FIG. 11, the operation of the biological-image processing unit 100 at the matching of feature data in the second embodiment will be described. In the operation of feature data matching illustrated in FIG. 11, the processes from step S1101 to S1104 for the matching data are the same as the processes from step S701 to S704 at feature data matching in the first embodiment illustrated in FIG. 7. In step S1105, the binarization processing section 111 of the feature-data acquisition section 107 translates the feature values (normalized feature values) normalized by the feature-value normalizing section 110 in step S1104 to binary data (binarized feature values) with reference to the binarizing information stored in the binarizing-information storing section 801. In step S1111, the registration data is loaded from the database 105 to the storage section 106, so that the registered binary data (binarized feature values) is obtained.

After the processes in step S1105 and step S1111 are executed, in step S1121, the matching processing section 103 performs the process of matching the registration data (template) and the matching data (input data). In step S1121, the Hamming-distance calculating section 104 of the matching processing section 103 calculates the Hamming distances between the feature values from the binary data (binarized feature values) of the feature values of the registration data and the matching data. The matching processing section 103 calculates the degree of similarity (feature value score) indicating how similar the feature values of the feature points are between the registration data and the matching data based on the Hamming distances calculated by the Hamming-distance calculating section 104 and determines whether the object is the identical person or another person based on the calculated degree of similarity (feature value score).

According to the second embodiment, as in the first embodiment, the feature values can be translated to binary data reflecting the magnitudes of the feature values, allowing expressing the distance (difference) between the feature values using the Hamming distance calculated using the binary data, thereby increasing the accuracy of biometrics authentication. Furthermore, by translating the normalized feature values to binary data (binarized feature values) with reference to the binarizing information stored in the binarizing-information storing section 801, the set value ("1" or "0") and the order of the bits can be changed based on the binarizing information, so that even the same feature value can be translated to different binary data. Therefore, for example, even if registration data leaks from one biological-image processing unit, the registration data is not used by other biological-image processing units by setting different items of binarizing information among the plurality of biological-image processing units. This provides higher security and secure biometrics authentication. The binarizing information may be switched not among biological-image processing units but among individuals.

Third Embodiment

Figure 12:
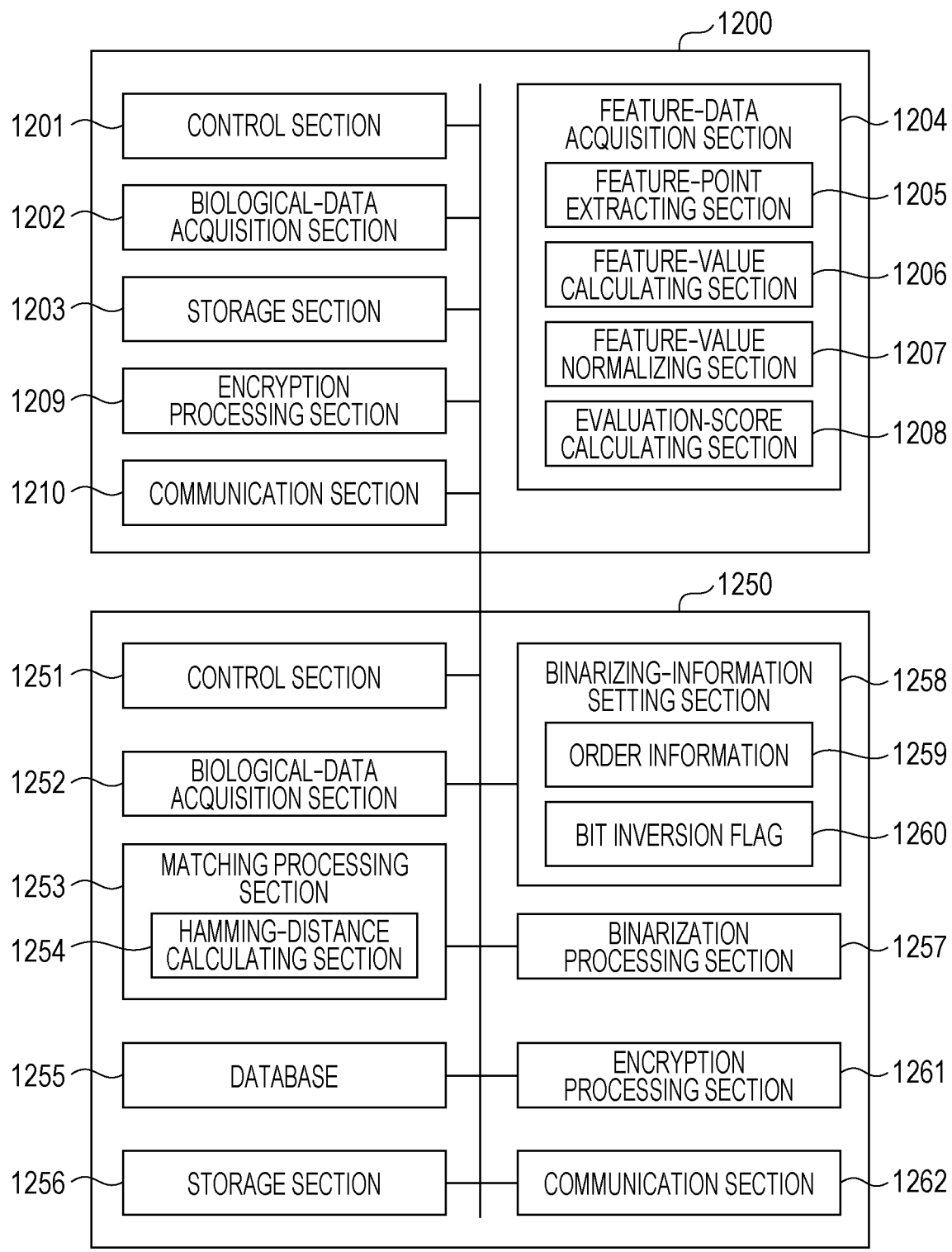
FIG. 12 is a diagram illustrating a configuration example of a biological-image processing unit of a third embodiment of the present disclosure.

Next, a third embodiment of the present disclosure will be described. Hereinafter, an example in which a biological-image processing unit incorporating binary translation of feature values in the present embodiment is used for a biometrics authentication apparatus, such as a palm vein authentication apparatus or a fingerprint authentication apparatus, that performs biometrics authentication using a biological image will be described. FIG. 12 is a diagram illustrating a configuration example of a biological-image processing unit of the third embodiment, illustrating an example of server authentication in which feature data on a biological image is transmitted from a remote terminal device 1200 to a server device 1250 for matching via a network or the like.

The remote terminal device 1200 includes a control section 1201, a biological-data acquisition section 1202, a storage section 1203, a feature-data acquisition section 1204, an encryption processing section 1209, and a communication section 1210. The control section 1201 controls the entire remote terminal device 1200 and controls over the functional sections of the remote terminal device 1200. Since the biological-data acquisition section 1202 and the storage section 1203 are respectively the same as the biological-data acquisition section 102 and the storage section 106 illustrated in FIG. 1, descriptions thereof will be omitted.

The feature-data acquisition section 1204 obtains feature data (the coordinates, the feature values, and so on of feature points) for use in authentication from the biological image. The feature-data acquisition section 1204 includes a feature-point extracting section 1205, a feature-value calculating section 1206, a feature-value normalizing section 1207, and an evaluation-score calculating section 1208. Since the feature-point extracting section 1205, the feature-value calculating section 1206, the feature-value normalizing section 1207, and the evaluation-score calculating section 1208 are respectively the same as the feature-point extracting section 108, the feature-value calculating section 109, the feature-value normalizing section 110, and the evaluation-score calculating section 112 illustrated in FIG. 1, descriptions thereof will be omitted.

The encryption processing section 1209 executes an encryption process for encrypting or decrypting the feature data (the coordinates, the feature values, and so on of the feature points) obtained by the feature-data acquisition section 1204. The communication section 1210 executes data communication processing between the remote terminal device 1200 and the server device 1250. For example, the communication section 1210 transmits encrypted feature data and so on to the server device 1250 or receives a matching result from the server device 1250.

The server device 1250 includes a control section 1251, a biological-data acquisition section 1252, a matching processing section 1253, a database 1255, a storage section 1256, a binarization processing section 1257, a binarized-information setting section 1258, an encryption processing section 1261, and a communication section 1262. The matching processing section 1253 includes a Hamming-distance calculating section 1254. The control section 1251 controls the entire server device 1250 and controls over the functional sections of the server device 1250.

Since the biological-data acquisition section 1252, the matching processing section 1253, the Hamming-distance calculating section 1254, the database 1255, the storage section 1256, and the binarization processing section 1257 are respectively the same as the biological-data acquisition section 102, the matching processing section 103, the Hamming-distance calculating section 104, the database 105, the storage section 106, and the binarization processing section 111 illustrated in FIG. 1, descriptions thereof will be omitted.

The binarized-information setting section 1258 sets binarizing information for translation from normalized feature values to binary data (binarized feature values). The binarizing information set by the binarized-information setting section 1258 includes order information 1259 and a bit inversion flag 1260. The order information 1259 is information indicating the order of bits to which value "1" is set according to the normalized feature values in translation from the normalized feature values to the binary data (binarized feature values). The bit inversion flag 1260 is information that inverts the values of all the bits of the binary data (binarized feature values) when the bit inversion flag 803 is set (value "1").

The encryption processing section 1261 executes an encryption process for encrypting and decrypting the input and output feature data (the coordinates, the feature values, and so on of feature points). The communication section 1262 executes a process of data communication between the server device 1250 and the remote terminal device 1200. For example, the communication section 1262 receives encrypted feature data and so on from the remote terminal device 1200 and transmits the result of matching to the remote terminal device 1200. Although FIG. 12 illustrate one remote terminal device 1200, a plurality of remote terminal devices 1200 may be connected to the server device 1250.

In the present embodiment, the feature values of the feature points contained in the registration data stored in the database 105 and in the matching data transmitted from the remote terminal device 1200 to the server device 1250 are encrypted normalized feature values. The encrypted normalized feature values are decrypted and translated to binary data (binarized feature values) immediately before the matching process is executed. The binarization processing section 1257 translates the normalized feature values to binary data (binarized feature values) based on the binarizing information including the order information 1259 and the bit inversion flag 1260 set by the binarized-information setting section 1258. The binarization processing section 111 executes binary translation of the feature values while changing the order of the bits to which a value is set or the set value according to the binarizing information set by the binarized-information setting section 1258.

Binary data (binarized feature values) may be stored in the database 1255 as registration data, as in the second embodiment. Although FIG. 12 illustrates a configuration in which encrypted normalized feature values are transmitted from the remote terminal device 1200 to the server device 1250, the remote terminal device 1200 may have a configuration for executing binarization and transmitting encrypted binary data (binarized feature values).

Figure 13:
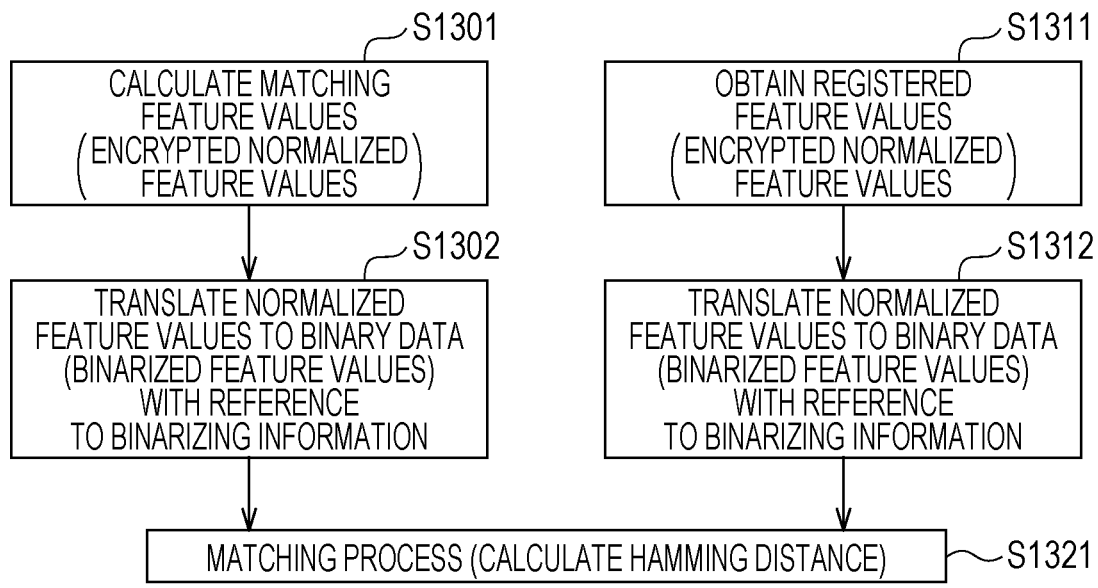
FIG. 13 is a flowchart illustrating an example of an operation for matching feature data in the third embodiment.

Since the operation of feature data matching in the third embodiment is similar to the operation in the first embodiment illustrated in FIG. 6, a description thereof will be omitted. However, in the third embodiment, the feature data is encrypted and is then stored in the database 1255. Referring to FIG. 13, the operation of feature data matching in the third embodiment will be described. In feature data matching, for matching data, first in step S1301, the remote terminal device 1200 obtains biological image data for matching and extracts feature values for matching from the obtained biological image data. The remote terminal device 1200 normalizes the extracted feature values, encrypts the normalized feature values, and transmits the encrypted normalized feature values to the server device 1250. In step S1302, the server device 1250, which has received the encrypted normalized feature values from the remote terminal device 1200 as matching data, decrypts the encrypted normalized feature values and translates the normalized feature values to binary data (binarized feature values) based on the set binarizing information.

For the registration data, in step S1311, the server device 1250 loads the registration data from the database 1255 to the storage section 106 and obtains the registered normalized feature values (encrypted normalized feature values). Next in step S1312, the server device 1250 decrypts the encrypted normalized feature values obtained in step S1311 and translates the normalized feature values to binary data (binarized feature values) based on the set binarizing information. The binarizing information set in the processes of step S1302 and step S1312 is the same.

After translation to binary data (binarized feature values) is executed in step S1302 and step S1312, the server device 1250 performs, in step S1321, matching of the registration data (template) and the matching data (input data). In step S1321, the server device 1250 calculates the Hamming distances between the feature values from the binary data (binarized feature values) of the feature values of the registration data and the matching data. The server device 1250 calculates the degree of similarity of the feature values of the feature points (feature value score) between the registration data and the matching data based on the calculated Hamming distances to determine whether the object is the identical person or another person based on the calculate degree of similarity (feature value score).

According to the third embodiment, the feature values for use in matching process can be translated to binary data reflecting the magnitudes of the feature values, allowing expressing the distance (difference) between the feature values using the Hamming distance calculated using the binary data, thereby increasing the accuracy of biometrics authentication. Furthermore, by changing the set value ("1" or "0") and the order of the bits based on the binarizing information, even the same feature value can be translated to different binary data. This provides higher security and secure biometrics authentication. For example, the binarizing information may be changed every time the matching process is performed. In this case, even in matching of the same person, a different binarization translation table is used each time matching process is performed. This increases the security in case of leakage of registration data expanded on the storage section 1256.

The biological-image processing unit according to the above embodiments can be implemented by, for example, a computer executing a program. A computer-readable storage medium that stores the program can also be an embodiment of the present disclosure. Examples of the storage medium include a flexible disk, a hard disk, an optical disk, a magneto-optical disk, a compact disc read-only memory (CD-ROM), a magnetic tape, a non-volatile memory card, and a read-only memory (ROM).

A program product that implements the functions of the above embodiments can be employed as an embodiment of the present disclosure by a computer executing the program. Examples of the program product include a program implementing the functions of the above embodiments and a computer on which the program is loaded. Other program products include a transmitter capable of providing the program to a computer connected so as to communicate with each other via a network and a network system including the transmitter.

The above program can also be employed as an embodiment of the present disclosure in the case where the functions of the above embodiments are implemented by an operating system (OS) running on a computer or another application or the like. Also in the case where all or part of the processes of the supplied program is performed by a function expansion unit of a computer to implement the functions of the above embodiments, the program can be employed an embodiment of the present disclosure. All or part of the program may be implemented by another computer so that the embodiments can be used in a network environment.

Figure 14:
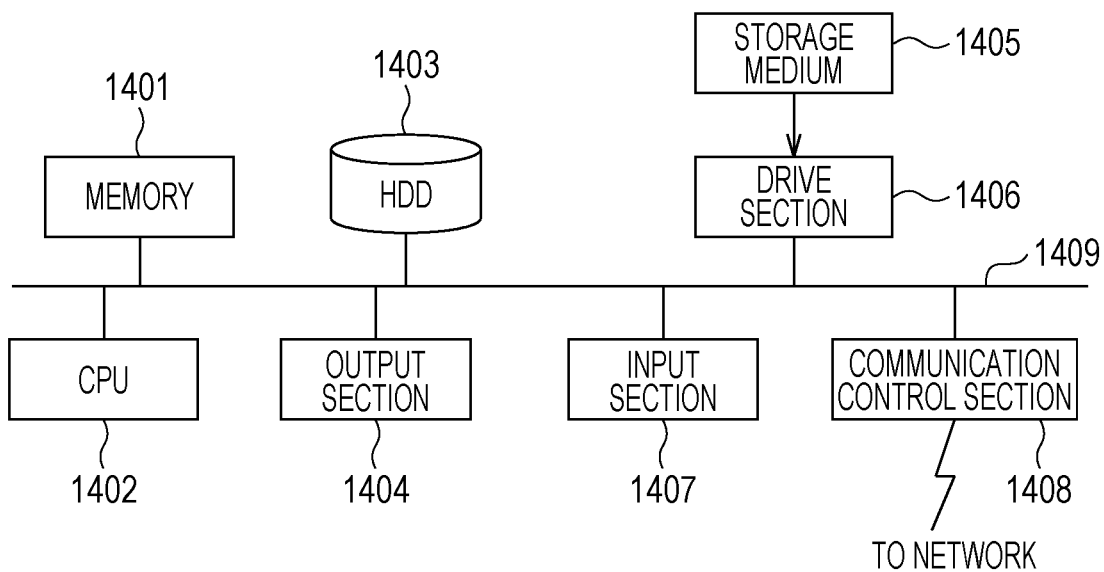
FIG. 14 is a functional block diagram of a computer capable of implementing the biological-image processing unit of an embodiment.
Figures 15A, 15B, 16:
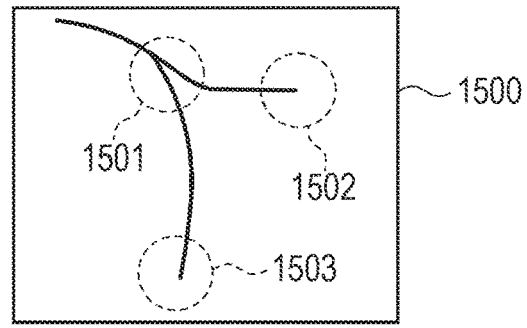
FIGS. 15A and 15B are diagrams illustrating feature points and feature values.
FIG. 16 is a diagram illustrating an example of a search result of feature point pairs.

For example, the biological-image processing unit of the embodiments can be implemented by a computer as illustrated in FIG. 14. The computer illustrated in FIG. 14 includes a memory 1401, which is an example of the storage section 106, a central processing unit (CPU) 1402, which is an example of the execution entity of the control section 101, the matching processing section 103, and the feature-data acquisition section 107, a hard disk drive (HDD) 1403, which is an example of the database 105 and the binarizing-information storing section 801, an output unit 1404, a drive unit 1406 for a storage medium 1405, an input unit 1407, which is an example of the biological-data acquisition section 102, and a communication control section 1408 for connecting to a network. Those components are connected to one another with a bus 1409. An operating system (OS) and an application program for implementing the processes in the above embodiments are stored in the HDD 1403 and are read from the HDD 1403 to the memory 1401 when executed by the CPU 1402. The CPU 1402 controls the output unit 1404, the drive unit 1406, the communication control section 1408, and so on according the processing details of the application program to cause them to perform predetermined operations. Although data being processed is stored mainly in the memory 1401, the data may also be stored in the HDD 1403. In this example, the application program for implementing the above processes is stored in, for example, the computer-readable portable storage medium 1405, is distributed, and is installed from the drive unit 1406 to the HDD 1403. The application program may be installed in the HDD 1403 via a network, such as the Internet, and the communication control section 1408. Such a computer implements the various functions of the above embodiments by organic cooperation of the hardware, such as the CPU 1402 and the memory 1401, and the software, such as the OS and the application program.

It is to be understood that the above embodiments are given for mere illustrative purposes in implementing the present disclosure and the technical scope of the present disclosure is not restrictive. In other words, the present disclosure can be embodied in various forms without departing from the technical spirit and its main features.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for biometric authentication using features points, the apparatus comprising:
   a processor that
      extracts a plurality of feature points from a biological image,
      calculates a feature value of each of the plurality of extracted feature points,
      normalizes the calculated feature values to values of N levels (N is any natural number) such that a number of appearance of values within each N level is equal within a distribution of the feature values, and
      translates each normalized feature value to binary data, wherein
         the translation sets a number of bits corresponding to the normalized feature value to one of two digits of the binary data,
         the normalized feature value and the number of bits with the one digit within the binary data are proportional to each other, and
      calculates a degree of similarity between registration data and matching data based on a degree of matching for each bit between first binary data obtained by translating the feature values of the registration data and second binary data obtained by translating the feature values of the matching data.

2. The apparatus of claim 1,
   wherein the processor
      calculates a Hamming distance between each feature value of the registration data and each feature value of the matching data from the first and second binary data, and
      calculates the degree of similarity between the registration data and the matching data based on the calculated Hamming distance.

3. The apparatus of claim 1,
   wherein the processor
      includes a translation table for translating the normalized feature values to the binary data, and
      translates the normalized feature values to the binary data with reference to the translation table.

4. The apparatus of claim 1,
   wherein the processor sets the number of bits during the translation based on order information,
   the order information specifies an order of the bits within the binary data that are set to the one digit.

5. The apparatus of claim 1, wherein the processor switches the binary digits based on a flag value instructing inversion of values of the binary digits.

6. The apparatus of claim 1,
   wherein an evaluation score according to a difference between the feature values calculated by the processor and an average value of the feature values obtained in advance, and
   wherein a feature point whose feature value is to be stored as registration data is selected based on the calculated evaluation score.

7. The apparatus of claim 1, wherein, when reading registration data to a storage section from a database that stores the normalized feature values as the registration data, the processor translates the normalized feature values to the binary data.

8. The apparatus of claim 1, wherein, when performing a process of matching registration data and matching data, the processor translates the normalized feature values stored as the registration data to the binary data.

9. The apparatus of claim 1,
   wherein the processor
      calculates an evaluation score from the binary data on the feature values,
      selects a feature point based on the calculated evaluation score, and
      stores the selected feature point as registration data.

10. The apparatus of claim 1, wherein the processor translates the normalized feature values to the binary data of (N - 1) bits.

11. A method performed by a computer for biometric authentication using features points, the method comprising:
    extracting a plurality of feature points from a biological image,
    calculating a feature value of each of the plurality of extracted feature points,
    normalizing the calculated feature values to values of N levels (N is any natural number) such that a number of appearance of values within each N level is equal within a distribution of the feature values,
    translating each normalized feature value to binary data, wherein
       the translating sets a number of bits corresponding to the normalized feature value to one of two digits of the binary data,
       the normalized feature value and the number of bits with the one digit within the binary data are proportional to each other, and
    calculating a degree of similarity between registration data and matching data based on a degree of matching for each bit between first binary data obtained by translating the feature values of the registration data and second binary data obtained by translating the feature values of the matching data.

12. A non-transitory computer-readable storage medium for storing a program for causing a processor to execute a process for biometric authentication using feature points, the process comprising:
    extracting a plurality of feature points from a biological image,
    calculating a feature value of each of the plurality of extracted feature points,
    normalizing the calculated feature values to values of N levels (N is any natural number) such that a number of appearance of values within each N level is equal within a distribution of the feature values,
    translating each normalized feature value to binary data, wherein
       the translating sets a number of bits corresponding to the normalized feature value to one of two digits of the binary data,
       the normalized feature value and the number of bits with the one digit within the binary data are proportional to each other, and
    calculating a degree of similarity between registration data and matching data based on a degree of matching for each bit between first binary data obtained by translating the feature values of the registration data and second binary data obtained by translating the feature values of the matching data.

* * * * *